United States Patent [19]

Shaw

[11] Patent Number: 4,895,024

[45] Date of Patent: Jan. 23, 1990

[54] IONICALLY CONDUCTIVE ACCELEROMETER

[75] Inventor: John E. Shaw, Middlesex, England

[73] Assignee: Thorn EMI plc, London, England

[21] Appl. No.: 267,424

[22] Filed: Nov. 4, 1988

[30] Foreign Application Priority Data

Nov. 5, 1987 [GB] United Kingdom ............... 8725911

[51] Int. Cl.⁴ ............................................. G01P 15/08
[52] U.S. Cl. ..................................... 73/517 R; 29/595
[58] Field of Search ......... 73/516 R, 516 LM, 517 R; 29/595

[56] References Cited

U.S. PATENT DOCUMENTS 3,084,557  4/1963  Von Ahlefeldt ............. 73/516 LM
3,170,817  2/1965  Mrgudich ......................... 73/517 R
3,309,930  3/1967  Jones ........................... 73/516 LM

FOREIGN PATENT DOCUMENTS 0146801  7/1985  European Pat. Off. .

Primary Examiner—John Chapman
Attorney, Agent, or Firm—Fleit, Jacobson, Cohn, Price, Holman & Stern

[57] ABSTRACT

An ionically conductive accelerometer comprises a body of an ionically conductive material provided with at least three electrodes which are so arranged as to define a respective ionically conductive path extending between one of the electrodes and each of the other electrodes. The accelerometer is responsive to an acceleration or a component of acceleration acting along each path.

9 Claims, 2 Drawing Sheets

IONICALLY CONDUCTIVE ACCELEROMETER

This invention relates to a device for the electrical measurement of acceleration, in particular to a device for the measurement of acceleration using an ionically conductive material.

It is known that an acceleration can produce an e.m.f. in conductors. The effect is dependent on the mass/charge ratio of the conducting species and has been demonstrated both in ionic solutions and metal conductors. One known solid state ionically conductive material is silver rubidium iodide ($Rb\ Ag_4\ I_5$), and other solid state ionically conductive materials include beta-alumina and certain conducting glasses.

Figure 1:
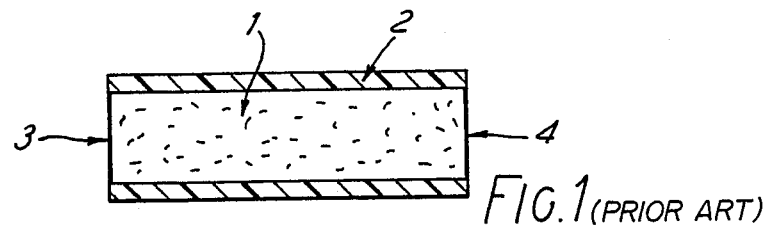

EP 146801A (Rickert) discloses a device for measuring a linear acceleration. This device, which is illustrated in FIG. 1 of the accompanying drawings, comprises an elongate solid state ionic conductor 1 contained in a hollow electrically insulating tube 2 and having electrodes 3,4 at either end. An acceleration having a component along the longitudinal axis of the tube produces a net displacement of the mobile ions within the bulk of the ion conductor in the opposite direction to that of the acceleration, thereby creating an e.m.f. between electrodes 3,4 which is proportional to the acceleration and to the length of the ionic conductor.

One object of the present invention is to provide ionically conductive accelerometer suitable for measuring acceleration along at least two intersection axes. Desirably, the accelerometer should be small, robust and light weight.

According to a first aspect of the invention there is provided an ionically conductive accelerometer comprising a body of an ionically conductive material provided with at least three electrodes which are so arranged as to define a respective ionically conductive path extending between one of the electrodes, and each of the other electrodes, the accelerometer being responsive to an acceleration, or a component of acceleration, acting along each path.

There are preferably four electrodes so arranged that the ionically conductive paths extend in mutually orthogonal directions.

In an especially convenient embodiment the ionically conductive accelerometer comprises an electrically insulative housing having a recess and an electrically insulative cap which is shaped and dimensioned to fit within the recess in spaced relationship to a surface thereof and wherein said body of an ionically conductive material substantially fills a space between said housing and said cap.

Such an arrangement provides for good thermal and electrical insulation and has beneficial dimensional stability. The said recess may be tapered and said one electrode may be located at, or adjacent to, the apex of the recess. The tapered recess may be in the form of a pyramid defined by three substantially identical, triangular surfaces with an electrode at, or adjacent to, each corner of the pyramid.

In accordance with another aspect of the invention there is provided a method of manufacturing an ionically conductive accelerometer according to a preferred embodiment of said first aspect of the invention, the method including the steps of providing said housing and said cap, the housing and cap being formed with said at least three electrodes, placing an amount of said ionically conductive material in the recess of the housing, and pressing the cap into said recess causing said ionically conductive material to fill a space between the housing and the cap.

The method may include the step of melting the ionically conductive material prior to the pressing step.

In order that the invention may be carried readily into effect particular embodiments thereof are now described, by way of example only, by reference to the accompanying drawings of which, FIG. 1 shows a known form of ionically conductive accelerometer, FIG. 2 and FIGS. 3a to 3c illustrate different forms of multi-axis ionically conductive accelerometer in accordance with the present invention.

Figure 4A:
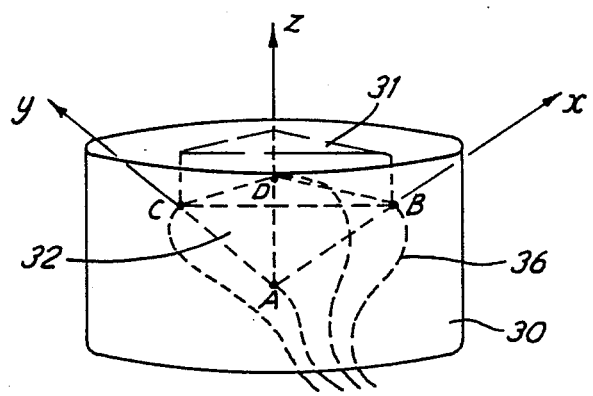
Figure 5:
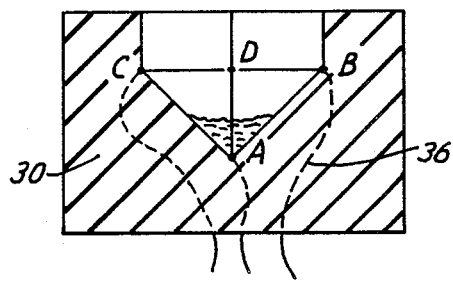
Figure 4B:
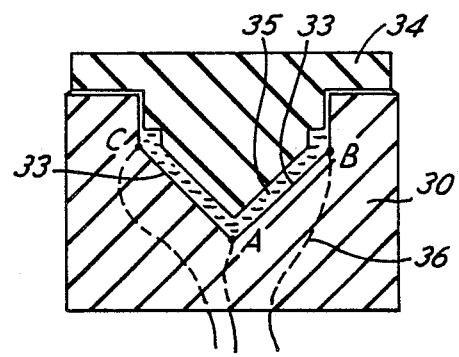
Figure 6:
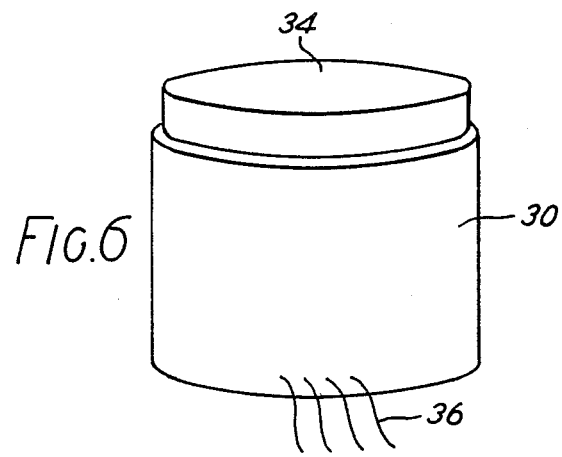

FIG. 4a illustrates a perspective, side elevation view of a part of a preferred ionically conductive accelerometer in accordance with the present invention and FIG. 4b illustrates a longitudinal, cross-sectional view of the preferred accelerometer, FIG. 5 illustrates a stage in the manufacture of the ionically conductive accelerometer shown in FIG. 4b and FIG. 6 shows a perspective side view of the accelerometer shown in FIG. 4b.

Figure 2:
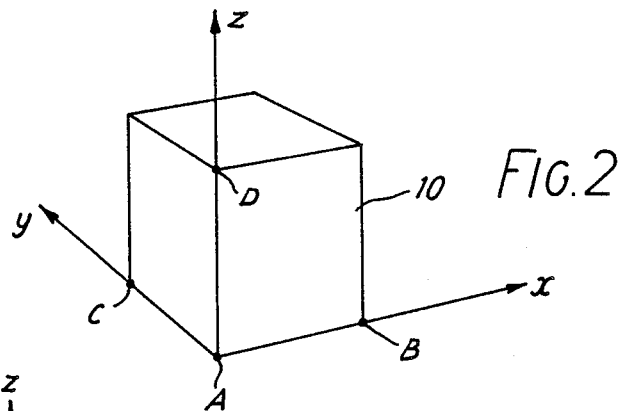

FIG. 2 of the drawings shows an ionically conductive accelerometer which is arranged to produce output voltages proportional to a respective acceleration, or a respective component of acceleration, in each of three, mutually orthogonal directions—the x, y and z directions.

The accelerometer comprises a cube 10 made of an ionically conductive material such as silver rubidium iodide ($Rb\ Ag_4\ I_5$) which is provided with four electrodes, one at each corner A, B, C and D of the cube. In this example, therefore, the accelerometer produces output voltages caused by displacement of mobile ions within the lengths of conductor between the electrodes at A and B, A and C, and A and D in response to an acceleration, or a component of acceleration in the x, y and z directions respectively.

Figure 3A:
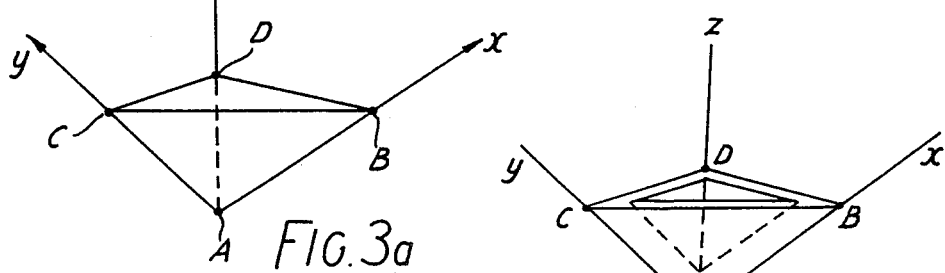
Figure 3B:
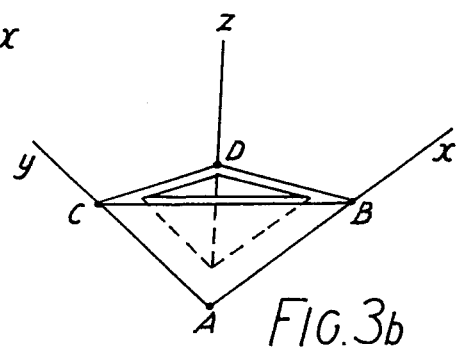
Figure 3C:
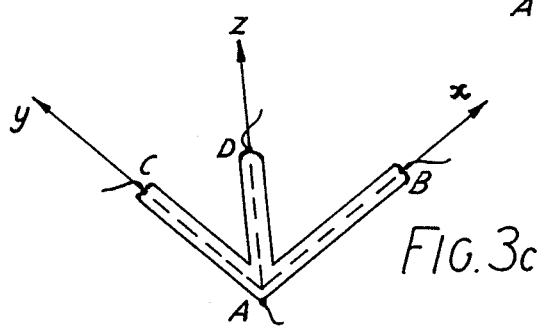

The accelerometer need not necessarily be in the form of a cube, as illustrated in FIG. 2, and alternative configurations are shown in FIGS. 3a, 3b and 3c. Referring to FIG. 3a, the accelerometer is in the form of a pyramid having four, identical triangular sides and an electrode at each corner, A, B, C and D. The edges AB, AC and AD of the pyramid point in mutually orthogonal directions and so, as before, the accelerometer is responsive to an acceleration, or a component of acceleration, in the x, y and z directions.

FIGS. 3b and 3c shown alternative configurations which, from a functional standpoint, are identical to that of FIG. 3a. The accelerometer shown in FIG. 3b is in the form of a hollow pyramid and the accelerometer shown in FIG. 3c comprises a unitary structure having three elongate limbs arranged in mutually orthogonal directions.

Other configurations can be envisaged; for example, the accelerometer could comprise a solid or hollow conical structure with an electrode at the apex and other electrodes arranged at regular intervals around the base.

It will, of course, be appreciated that, in each case, the accelerometer could be provided with three, instead of four, electrodes and would then be responsive to an acceleration, or a component of acceleration, in each of two directions only.

FIGS. 4a and 4b of the drawings illustrate a particularly advantageous implementation of a three-axis, ionically conductive accelerometer in accordance with the present invention. The accelerometer comprises a cylindrical housing 30 which is made of an electrically insulative material, for example a ceramic, and is provided with a recess 31. A part 32 of the recess has a tapered configuration and is in the form of a pyramid defined by three identical, triangular surfaces 33 and whose edges AB, AC and AD point in three mutually orthogonal directions, along the x, y and z directions. The accelerometer has a cap 34, also made of an electrically insulative material which is so shaped and dimensioned as to fit in recess 31 in spaced relationship to surfaces 33. The housing 30 and the cap 34 define a cavity which has the same, hollow pyramidal shape as the structure of FIG. 3b and is filled with an ionically conductive material 35. In this example, silver rubidium iodide (Rb Ag$_4$ I$_5$) was used. In effect, the housing and cap serve as a mould for the ionically conductive material. An electrode, typically of silver or copper, is attached to a surface of the recess at each corner of the pyramid and a respective lead 36 is connected thereto.

In order to assemble the accelerometer, the ionically conductive material is initially placed at the bottom of recess 31, a shown in FIG. 5, and the cap is then pushed into the recess squeezing the material around the cap, filling the cavity and establishing electrical contact with the four electrodes. FIG. 6 shows an external perspective view of the completed structure.

Preferably, though not necessarily, this procedure is assisted by first melting the ionically conductive material placed in the recess and, in these circumstances, both the housing and the cap should be capable of withstanding a temperature in excess of the melting temperature of the material (250° in the case of Rb AG$_4$ I$_5$).

One suitable ceramic material has the following constituents:
- 5% by weight of zinc oxide (ZnO) or magnesium oxide (MgO),
- 28% by weight of an aqueous solution of 48% by weight of of aluminium orthophosphoric acid,
- 67% by weight of a filler material comprising alumina, mica, pearlite and or silica.
- and up to 5% by weight of a ceramic fibre (e.g. glass wool) which provides additional strength.

These constituents are mixed thoroughly in a compounding extruder and the mixture is then fed into a suitably shaped mould, preferably made of silicone rubber, allowed to set and then fired at a temperature of between 800° C. and 1000° C. The electrodes and leads (or channels to accommodate the leads) are set in place within the mould prior to introduction of the ceramic mix.

The ionically conductive material placed in the recess may comprise either powdered silver rubidium (Rb Ag$_4$ I$_5$) or a mixture of silver iodide (Ag I) and rubidium iodide (RbI) in the molecular proportions 4:1 and in some circumstances it may be desirable to strengthen the material thereby to alleviate the risk of cracking during cooling. It has been found that the susceptibility to cracking can be reduced substantially by inclusion of from 10% to 30% by solid volume of an electrically insulative material—for example the ionically conductive material may comprise 20% by solid volume of glass (silica) wool and 80% by solid volume of silver rubidium iodide, the equivalent proportions, by weight, being about 10% of glass wool and 90% of silver rubidium iodide (assuming specific gravities of 5.3 and 2.4 respectively). These materials may be mixed with a carrier such as butanol which fires off at about 150° C. Although the iodide melts at about 250° C. heating to about 500° C. ensures that the surfaces of the glass wool are thoroughly wetted.

Other solid state ionically conductive materials could be used such as beta-alumina and certain ion conducting glasses.

The structure described by reference to FIGS. 4 to 6 is particularly advantageous in that the ceramic housing provides good thermal and electrical insulation and has beneficial dimensional stability.

It will be appreciated that the accelerometer need not necessarily have a pyramidal form as described by reference to FIGS. 4 to 6. Alternatively, for example, the recess and cap may be appropriately configured to define a body of ionically conductive material in the form of a hollow cone and clearly other configurations, such as that shown in FIG. 3c, are feasible. Moreover, the distances between the electrodes in each electrode pair need not necessarily be equal, allowing different sensitivities along respective ones of the measurement axes.

The electrodes need not necessarily be attached to a surface of the recess formed in housing 30; alternatively the electrodes could be attached to appropriate surfaces of the cap with the leads being routed via the cap instead of the housing, or to both the cap and housing. If desired a respective surface of the cap or recess could be made relatively flat to assist easy location of an electrode, especially in the region of the apex of the recess.

The dimensions of the body of ionically conductive material will depend on the application, particularly on the sensitivity required and the maximum acceptable output impedance of the accelerometer. For example, a bar of material $40 \times 2 \times 2$ mm has a sensitivity of 0.4 $\mu$V/G, where G is the acceleration due to gravity, and a resistance of $1.7 \times 10^3$ ohms. The sensitivity is proportional to the length of the bar and the resistance is proportional to the length of the bar and inversely proportional to the cross-sectional area of the bar.

An accelerometer in accordance with the present invention can be readily manufactured in quantity and can be configured to have a compact, lightweight and robust structure suitable for use in applications where space is limited eg in avionics applications.

I claim:

1. An ionically conductive accelerometer comprising a body of an ionically conductive material provided with at least three electrodes which are so arranged as to define a respective ionically conductive path extending between one of the electrodes and each of the other electrodes, the accelerometer being responsive to an acceleration, or a component of acceleration acting along each said path.

2. An ionically conductive accelerometer according to claim 1 including four said electrodes so arranged that said ionically conductive paths extend in mutually orthogonal directions.

3. An ionically conductive accelerometer according to claim 1 comprising an electrically insulative housing having a recess and an electrically insulative cap which is shaped and dimensioned to fit within said recess, in spaced relationship to a surface thereof, and wherein said body of an ionically conductive material substantially fills a space between said housing and said cap.

4. An ionically conductive accelerometer according to claim 3 wherein the housing has a tapered said recess and said one electrode is located at, or adjacent to, the apex of the recess.

5. An ionically conductive accelerometer according to claim 4 wherein the housing has a pyramidal said recess defined by three triangular surfaces and includes a said electrode at, or adjacent to, each corner of the recess.

6. An ionically conductive accelerometer according to claim 5 wherein said triangular surfaces are substantially identical.

7. An ionically conductive accelerometer according to claim 3 wherein said housing and said cap are made of a ceramic material.

8. A method of manufacturing an ionically conductive accelerometer according to claim 3 comprising the steps of providing said housing and said cap, the housing and cap being formed with said at least three electrodes,
placing an amount of said ionically conductive material in the recess of the housing,
and pressing the cap into said recess causing said ionically conductive material to fill a space between the housing and the cap.

9. A method according to claim 8 including the step of melting said ionically conductive material prior to the pressing step.

* * * * *